July 9, 1974     A. G. PETZETAKIS     3,823,216

METHOD OF MAKING A PIPE-COUPLING PART

Filed May 19, 1972     3 Sheets-Sheet 1

# United States Patent Office 3,823,216
Patented July 9, 1974

3,823,216
METHOD OF MAKING A PIPE-COUPLING PART
Aristovoulos G. Petzetakis, Thessaloniki and Chandri St., Moschaton, Piraeus, Greece
Filed May 19, 1972, Ser. No. 255,221
Claims priority, application Greece, July 19, 1971, 45,895
Int. Cl. B29c *17/07*
U.S. Cl. 264—89          1 Claim

ABSTRACT OF THE DISCLOSURE

A method of making pipe-coupling parts in which a plastically deformable end of a pipe or tube is deformed from within by pressing outwardly a forming portion of a tool and by retaining a wall portion axially removed therefrom by suction against the tool and then axially shifting it with respect to another wall portion.

1. Field of the Invention

The present invention relates to a method of making pipe-coupling parts, to the parts made by this method and to an apparatus or device, using the aforestated method, for making the pipe coupling parts. More particularly, the invention relates to improvements in the formation of pipe couplings in which the outer member or sleeve of a pipe coupling is formed with an annular seal-receiving recess in which the male member of the coupling is received.

2. Background of the Invention

Pipe couplings have been provided heretofore in the form of interfitting or mating ends of pipe members, generally composed of synthetic-resin materials, in which the outer member or sleeve-forming member is provided with an annular inwardly open recess, channel or groove accommodating an elastically deforming sealing ring which engages the outer circumference of the inner or male pipe member. Various configurations of the sleeve or female member have been proposed and various methods of inserting the sealing ring suggested in the art. In one system, the inner and outer members are provided with circumferential formations which define a crescent-section channel which may be filled with an adhesive. In other arrangements, the inner member may be formed with a sealing ring engaging the outer member. In all such systems, however, it is a common practice to provide an enlarged sleeve portion at the end of the female member to accommodate the male member with a minimum of change in the flow cross-section of the connected pipe at the pipe coupling or joint.

It is thus desirable to provide a pipe member, preferably for use in a pipe coupling, which has an internally calibrated cylinder portion for receiving a male member in the manner described. When the pipe is composed of a synthetic-resin material and is produced by centrifugal casting, rotational casting or any of the various molding processes, the die or mold may be provided with appropriate formations which can produce the enlarged portion, the described internal diameter thereof and any recesses, humps or like coupling formations which may be required. However, most synthetic-resin pipe is conventionally produced by extrusion and by other methods which give rise to a tube of constant wall thickness and substantially constant cross-section. The tube may be substantially continuous so that various pipe lengths are formed by cutting the pipe transversely. Especially for such pipe it may be desirable to provide an internally calibrated enlargement which may also be formed with an internally open peripheral or annular recess for accommodating sealing means, e.g. a body of adhesive, a sealing ring or the like. To provide such configurations at the end of a pipe of constant cross-section has proved to be difficult heretofore and, to applicant's knowledge, no convenient means has been proposed for accomplishing this purpose.

It should be noted that the internally calibrated enlarged cylindrical sleeve portion of the pipe under discussion may be used for substantially any purpose, but preferably is an external member of a pipe coupling of the tight-fitting type wherein a male pipe member is inserted into a female pipe member. However, should such configuration be desired for other purposes, the method will be equally applicable.

3. Objects of the Invention

It is the principal object of the present invention to provide an improved method of making a sleeve-shaped enlargement in a pipe for the purposes described whereby the disadvantages of earlier methods can be avoided.

It is another object of this invention to provide a device for internally deforming a pipe member to provide an internally calibrated sleeve-like configuration.

A more general object of the invention is to provide an improved method of forming a pipe-coupling member on a length of pipe with accuracy, high speed and efficiency.

Yet another object of the invention is to provide an improved method of making a pipe coupling.

Still another object of the invention is to provide an improved device of simple construction and operation for internally calibrating a portion of a pipe length and providing the same with an enlarged sleeve portion as well as an internally open recess, e.g. for use in sealing two members of a pipe coupling together.

4. Summary of the Invention

These objects and others which will become apparent hereinafter are attained, in accordance with the present invention, in a method of forming an internally expanded, internally calibrated sleeve portion of a pipe with an inwardly open circumferential recess, e.g. for accommodating a seal, and for forming an outwardly bulging circumferential corrugation in this portion, by inserting a tool into a plastically deformable end of the pipe, drawing the wall of the pipe inwardly against a generally cylindrical forming surface of the tool, preferably by suction, and axially shifting two portions of the deformable end of the tool toward one another while holding at least one of them against the surface of the tool to cause the intervening part of the pipe to bulge outwardly and produce the corrugation while simultaneously forming the inwardly open recess mentioned earlier.

The invention thus consists of a relatively simple system for the internal calibration of pipe-coupling sleeve portions integrally formed at an end of a pipe having a shape and dimension which is highly precise for tight sealing of the coupling but which is free from variations of wall thickness.

According to an important feature of the invention, an internally calibrated coupling-sleeve portion or pipe is produced with a sealing corrugation or channel from a thermoplastic synthetic-resin pipe, an end of which has been rendered thermoplastically deformable, e.g. by heating. The plastically deformable pipe end is slitted axially over a spreading mandrel which is preferably cylindrical and has a layer diameter of the pipe, the corrugation being provided by displacing two axially spaced portions of the plastically deformable end toward one another and cooling the pipe to cause the thermoplastic material to solidify. The resulting sleeve portion, with circumferential corrugation, can then be withdrawn from the mandrel.

More specifically, the mandrel comprises two axially spaced portions of identical outer diameter which are axially shiftable relative to one another, including an outer portion provided with a shoulder forming an abutment for the end face of the tube when the leading portion thereof of the mandrel is inserted into the tube. The tube wall is attracted to the surface of this leading portion of the tube and is axially drawn thereby toward the abutting free end of the tube by shifting the most advanced portion of the mandrel in a direction corresponding to withdraw the device from the tube.

It has been found to be preferable to draw the inner portion of the tube end toward the end face thereof as soon as withdrawal of the forming tool is begun, although it may be desirable for certain applications to permit some withdrawal of the forming tool prior to its entrainment of a portion of the tube wall therewith. The latter procedure may be used when it is desired to shift the location of the peripheral corrugation axially toward the end of the tube which is held stationary. Thus the steps of the invention may comprise inserting an expanding and calibrating member into a plastically deformable tube end to expand this end and form a sleeve portion of increased diameter; withdrawing the tool through this end; axially entraining a wall portion of the tube along with the tool during the withdrawal thereof over at least a portion of such withdrawal by applying a reduced pressure within the tube and causing an inward pressure differential to enable the entrained wall portion of the tube to hug the tool; and immobilizing the end face of the tube through which the tool is to be withdrawn during the withdrawal operation while the wall of the tube hugs and frictionally engages the tool to bulge a portion of the wall outwardly and thereby form the corrugation.

Preferably the reduced pressure or suction is applied immediately upon or prior to the commencement of the withdrawal of the tool and suction is additionally applied immediately adjacent the immobilized end face of the tube to hold at least a portion of the wall in the region of this end face against the cylindrical portion of the tool while the wall between the two hugging portions is permitted to bulge outwardly. Advantageously, the outwardly bulging portion is supported by a corrugation-shaping member forming part of the tool.

It should be understood that, since the corrugation-forming material of the tube is urged outwardly by this member of the tool, the material derives from an axially moving part of the tube and thinning of the wall does not occur either in the region of the corrugation or elsewhere.

The compression type of deformation of the tube may also result in some thickening or increase in the wall thickness in the region of the corrugation if desired. The latter is advantageous when considerable stress is to be applied at the corrugation. In practice, one is able to build up large wall thicknesses for any configuration of the corrugation and to provide coupling portions of a pipe which may have greater strength than portions beyond the coupling. The coupling sleeve may be, in fact, the strongest portion of the pipe line composed of the thermoplastic synthetic-resin duct of the instant invention.

It has been found to be advantageous, moreover, to provide a tool which comprises an enlarging mandrel of generally cylindrical configuration with a forwardly and inwardly tapered leading end to enable the pipe to be spread and receive the mandrel. The mandrel is provided along its length, preferably at an intermediate location, with a radially expandable and contractable corrugation-forming member. Furthermore, the mandrel is provided with an internal space, i.e. is hollow, and formed with outwardly extending bores communicating with the hollow interior in which suction may be generated. Advantageously, the cylindrical mandrel has a cylindrical smaller-diameter portion forming a guide for the pipe, a larger diameter portion rearwardly thereof and an outwardly divergent frustoconical ramp extending between these portions and serving to spread the thermoplastic tube. The mandrel may be provided upon a pipe which can be connected with a suction source so that an outer forming tool may be avoided.

The corrugation-forming member is preferably constituted as a pressure ring of a flexible material, e.g. rubber which may be reinforced with fabric, metal screening or the like, held between a shoulder of the mandrel and a shoulder of the abutment for the end face of the tube. The ring may surround the pipe mentioned earlier and is axially compressible to cause the ring to bulge outwardly beyond the maximum diameter of the mandrel. The relative axial displacement of the mandrel and the abutment means is preferably provided by a fluid-responsive device, e.g. a piston-and-cylinder arrangement and the pipe and abutment member may be formed with pressure disks against which the cylinder arrangement reacts for such displacement. When a plurality of corrugations is desired on an end of a pipe, a corresponding number of outwardly bulging compression rings may be provided between the pressure arrangement with intervening axially shiftable but incompressible disks. The abutment can, moreover, be provided with a cylindrical shoulder formed with suction ports communicating with an annular groove and connected to a suction source for retaining a defined length of the thermoplastic tube against this forming portion until the corrugation is established.

The system described above has numerous advantages not only with respect to the simplicity with which the sleeve portion of the pipe is internally calibrated and the corrugation formed, but also with respect to the precision of the configuration and dimensions. In a simple and convenient manner, it is possible to deform the pipe without weakening it and without creating high-stress regions. As a consequence, the product is particularly effective in pipe couplings of the character descibed, the device for making the coupling is simply constructed and easily operated and the method can be performed without difficulty.

5. Description of the Drawing

The above and other objects, features and advantages of the present invention will become more readily apparent from the following description reference being made to the accompanying drawing in which.

6. Specific Description

Figure 1:
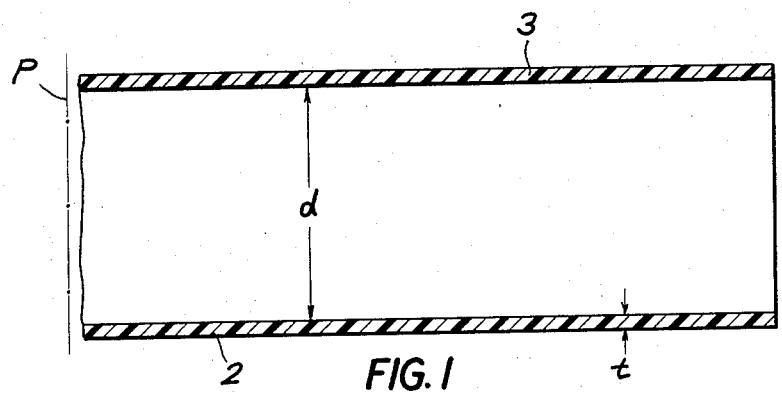
FIG. 1 is an axial cross-sectional view of a pipe composed of thermoplastic material to be provided with a sleeve portion according to the present invention.

In FIG. 1 of the drawing, there has been illustrated a pipe 2 of a thermoplastic material which is to be provided with a coupling sleeve portion as will be apparent hereinafter. The pipe is composed of a thermoplastic synthetic-resin, e.g. polyvinyl chloride and is of a substantial constant wall thickness $t$ and of any desired length. The internal diameter is indicated for purposes of discussion at $d$ and the discussion below may refer to a fixed reference point P to insure a better understanding of the invention.

Figure 2:
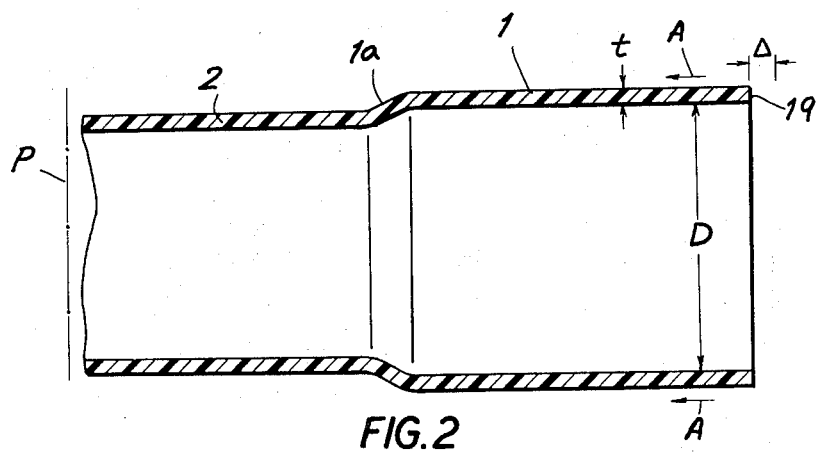
FIG. 2 is an axial cross-sectional view through the pipe showing the enlarged portion of the latter prior to formation of the corrugation therein.
Figure 3:
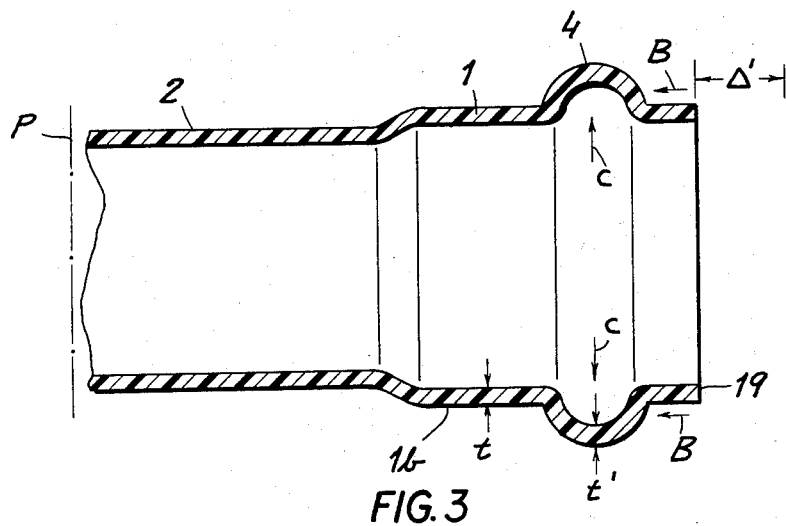
FIG. 3 shows the finished sleeve portion in relation to the corresponding portions of FIGS. 1 and 2.

In FIG. 2, the enlarged sleeve portion of diameter D has been illustrated. This sleeve portion is formed by retaining the point P of the pipe at its original location and shifting the end face 19 thereof axially in the direction of arrow A through the distance represented by Δ. This may be accomplished by a device illustrated in FIGS. 4–6, using the mandrel to hold the shape. The sleeve portion 1 is thus connected to the pipe 2 and has a wall thickness $t$ equal to that of the pipe. A ramp 1a connects the enlarged diameter portion with the unchanged remainder of the pipe. From FIG. 3 it will be apparent that a corrugation 4 may also be formed in the pipe when the latter is in a thermoplastic condition (e.g. by heating), the point P is immobilized, the inner section 1b of the enlarged sleeve portion 1 is held against movement, and the end face 19 is shifted axially in the direction of arrow P, by the additional increment Δ. The thickness $t'$ of the corrugation may be equal to or greater than the thickness $t$ of the remainder of the pipe. Consequently, upon cooling of the pipe, the latter will retain the corrugated configuration which has been illustrated in FIG. 3. As a result, the pipe coupling of FIG. 7 may be formed. In general, the corrugation 4 will be produced at least in part by urging the corrugated portions radially outwardly as represented by the arrows C. Referring now to FIG. 7, it can be seen that the corrugation 4 may accommodate a sealing ring 5 which hugs the constant-cross-section male portion 3 which is inserted into the sleeve portion 1 formed in the pipe end 3. The front end of the undeformed pipe end 3' may be beveled at 3" to spread the sealing ring which is trapped in the corrugation. The corrugation 4 may be as deep as is necessary to enable the sealing ring 5 to be retained without additional means. Alternatively, the corrugation 4 may be provided with an opening into which an adhesive is introduced, may register with the corrugation on the male end 3', may be bonded to the sealing ring 5 by an adhesive or may accommodate a clamping ring.

Figure 4:
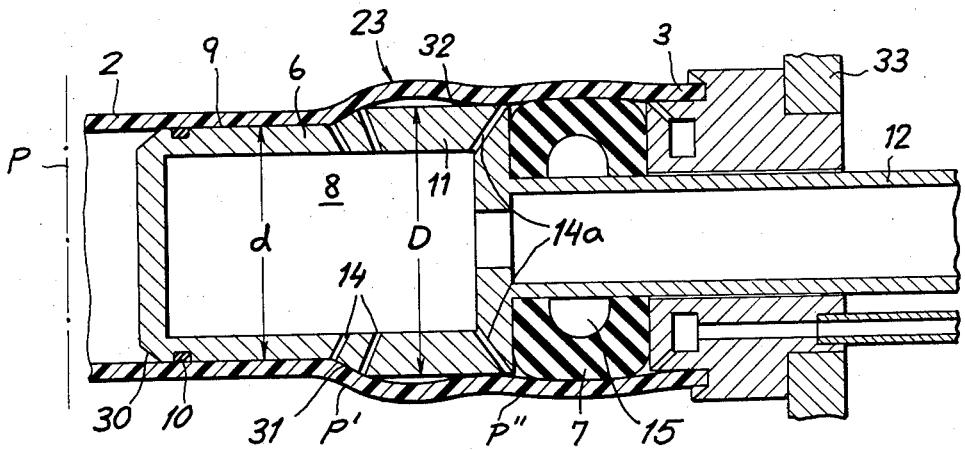
FIGS. 4 to 6 are axial cross-sectional views showing the device of the present invention in various operating positions.
Figure 5:
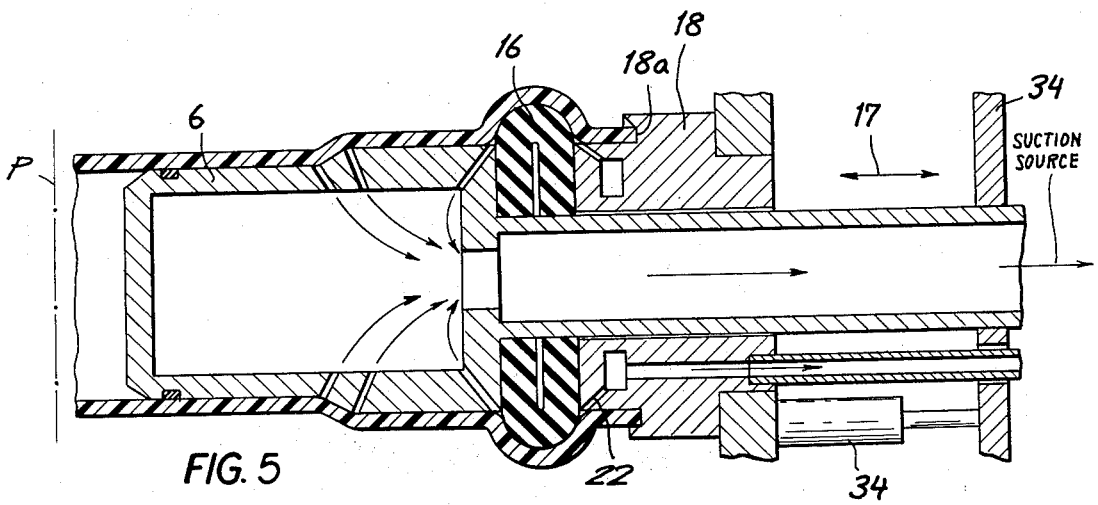
Figure 6:
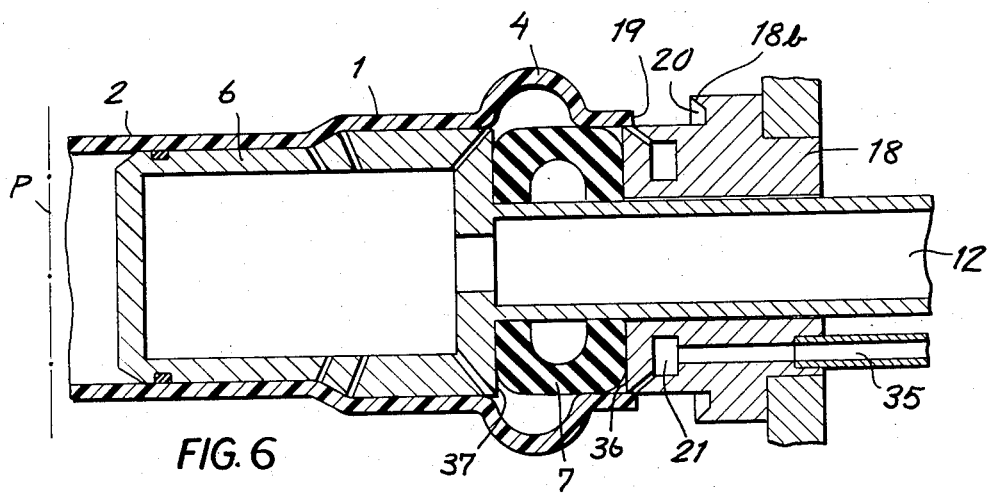
Figure 7:
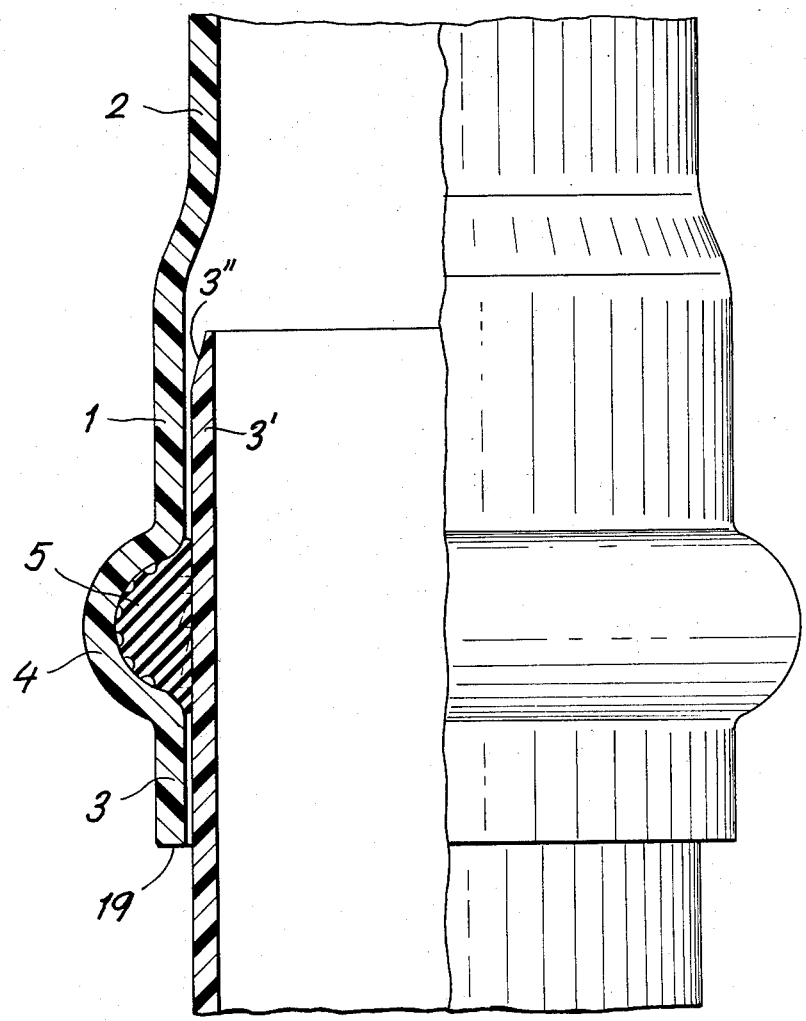
FIG. 7 is an axial cross-sectional view, partly in elevation, of the finished coupling.

In FIGS. 4–6 the steps of the present invention are illustrated with respect to a device for producing the enlarged sleeve portion. The device comprises an expanding mandrel 6 having a leading portion 9 of an outer diameter $d$ corresponding to the internal diameter of the undeformed pipe 2, a beveled leading edge 30 to facilitate insertion of the mandrel into the pipe end, and a sealing ring 10 seated in a groove along the outer periphery of this mandrel to resiliently hug the inner tube wall and prevent fluid leakage between the mandrel and this wall. The sealing ring 10 is composed of rubber. Rearwardly of the leading portion 9 of the mandrel, is a trailing portion 11 of the increased outer diameter D while a ramp 31 connects the two portions of the mandrel. The interior of the mandrel forms a hollow space 8 which communicates with the mandrel surface the ramp 31 via forwardly and outwardly inclined bores 14. Rearwardly and outwardly inclined bores 14a communicate between the interior 8 of the hollow mandrel and the outer mandrel surface 32 at the end thereof. The mandrel 6 is formed on the end of a rigid pipe 12 connected to a suction source for evacuating the chamber 8.

Cooperating with the mandrel is a pressure ring 18 which is received in a holder 33 which may be anchored to one side of a hydraulic cylinder represented diagrammatically at 34. The other side of this arrangement bears upon a disk 34 connected to the pipe 12 which is received with clearance in the pressure disk 18. The cylinder is thus adapted to shift the pipe and the pressure disk relatively in the direction of arrow 17 and urge the face 19 of the pipe to the left relative to the point P or the points P' and P" as established by the suction force and friction force as discussed below. The pressure disk 18 is formed with an abutment surface 18a and an inwardly beveled flank 18b leading thereto and defined by a circular recess 20 accommodating the end flank 19 of the pipe. The circular recess 20 is formed at a shoulder separated by a cylindrical mandrel portion 34 of the pressure disk 18 which may have an outer diameter $d$ equal to the inner diameter of the pipe 2. Forwardly and outwardly oriented bores 22 open at this surface and communicate with an annular chamber 21 within the pressure disk 18 which may be connected via pipe 35 to a suction source as described previously.

The pressure disk 18 is formed with a face 36 confronting a shoulder 37 of the mandrel, the face and shoulder clamping a forming ring 7 of rubber or like flexible material between them. The forming ring 7 which is of U-section, is provided with an internally open annular cavity 15 and surrounds the pipe 12. The shanks of the U thus can be urged together axially (compare FIGS. 4 and 5) to drive the bight 16 outwardly and deform the pipe beyond the diameter of the mandrel.

7. Specific Example

A hard polyvinyl chloride pipe is deformed with the apparatus illustrated in FIGS. 4–6. Either the pipe may be held fixed and the pressure plate 18 shifted with respect to the mandrel or the mandrel may be displaced with respect to the pressure plate. Both may be drawn together if desired.

The pipe is heated to a temperature of 145 to 165° C. (a softening point) and before it has been fully softened, is fed onto the mandrel 6. Oil or glycerin is applied as a lubricant between the inner wall of the pipe on the outer surface of the mandrel. With the apparatus in the position illustrated in FIG. 4, the end of the pipe is lodged in the recess 20. The axial *motion* of the remainder of the pipe may continue to cause thickening of the softened pipe walls at 23.

Figure 8:
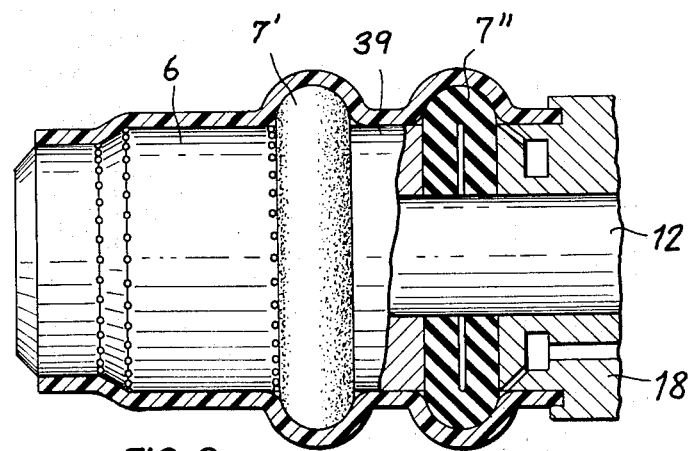
FIG. 8 is a view similar to any of FIGS. 4 to 6 but showing the formation of a multicorrugation arrangement.

Suction is applied in chamber 8 and in passage 21 to retain the corresponding portions of the pipe wall against the mandrel (FIG. 5) thereby straightening the bulges 23 and increasing the thickness of the region around the ring 7. The pressure disk 18 and the mandrel 6 are then urged together (FIG. 5) while suction continues to bulge the ring 7 outwardly and form the corrugation. With the device in the position shown in FIG. 5, the pipe 2 is sprayed with water and fixed in its deformed position. Cylinder 34 is relieved, thereby drawing the pipe end away from the pressure disk 18 as illustrated in FIG. 6 enabling the pipe to be axially removed from the mandrel. In FIG. 8, there is shown an arrangement in which a plurality of rings 7', 7" may be provided with intervening spacers 39 when it is desired to provide multicorrugation systems and, for example, sleeves accommodating male coupling portions one at each end. Otherwise the apparatus of FIG. 8 is identical to that of FIGS. 4–6.

I claim:

1. A method of making a pipe-coupling part by forming an internal U-section circumferential channel in an end of a pipe composed of thermoplastic material of uniform cross section whereby said channel can accommodate a seal, said method comprising the steps of:
   (a) heating said end of said pipe to render same plastically deformable;
   (b) forcing said end of said pipe over a mandrel having an outer diameter greater than the original internal diameter of said pipe to expand said end and bringing said end into engagement with an axial abutment of said mandrel;
   (c) applying suction within said end of the plastically deformable pipe to retain the same against said mandrel at two axially spaced locations along said pipe;
   (d) axially compressing an elastically deformable member between said locations on said mandrel to bulge said member outwardly and shape the portion of the plastically deformable pipe end overlying said member with an outwardly convex bulge, thereby forming an internally open U-section channel in said plastically deformable pipe end; and
   (e) rigidifying said end of said pipe, drawing said member out of said channel, and withdrawing said mandrel from said pipe end.

(References on following page)

References Cited

UNITED STATES PATENTS

| | | | |
|---|---|---|---|
| 3,432,887 | 3/1969 | Poux et al. | 425—393 |
| 3,728,059 | 4/1973 | De Putter | 425—393 |
| 3,520,047 | 7/1970 | Muhlner et al. | 264—92 |
| 3,360,826 | 1/1968 | Lorang | 425—392 |
| 3,484,900 | 12/1969 | Sands et al. | 425—393 |
| 3,425,093 | 2/1969 | Ansette | 264—322 |
| 2,347,101 | 4/1944 | Harding | 425—392 |
| 3,445,552 | 5/1969 | Aungst et al. | 264—322 |
| 3,728,065 | 4/1973 | Figwer | 425—392 |

ROBERT F. WHITE, Primary Examiner

J. B. LOWE, Assistant Examiner

U.S. Cl. X.R.

264—92, 296, 313; 425—393